US012328327B2

(12) United States Patent
Friedlander et al.

(10) Patent No.: US 12,328,327 B2
(45) Date of Patent: *Jun. 10, 2025

(54) SYSTEM AND METHOD FOR ANOMALY DETECTION INTERPRETATION

(71) Applicant: ARMIS SECURITY LTD., Tel Aviv-Jaffa (IL)

(72) Inventors: Yuval Friedlander, Petah Tiqwa (IL); Ron Shoham, Tel Aviv (IL); Gil Ben Zvi, Hod Hasharon (IL); Tom Hanetz, Tel Aviv (IL)

(73) Assignee: ARMIS SECURITY LTD., Tel Aviv-Jaffa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,297

(22) Filed: Oct. 11, 2023

(65) Prior Publication Data

US 2024/0154984 A1    May 9, 2024

Related U.S. Application Data

(63) Continuation of application No. 17/093,915, filed on Nov. 10, 2020, now Pat. No. 11,824,877.

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC ............. H04L 63/1425; H04L 63/1441; H04L 41/147; H04L 63/20; G06N 20/00; H04W 12/12

See application file for complete search history.

(56) References Cited

U.S. PATENT DOCUMENTS

| | | | |
|---|---|---|---|
| 9,412,024 B2 | 8/2016 | Chaudhury et al. | |
| 10,045,218 B1 | 8/2018 | Stapleton et al. | |
| 10,924,503 B1* | 2/2021 | Pereira | H04L 63/20 |
| 11,190,641 B1* | 11/2021 | Shukla | G06F 40/279 |
| 2019/0020670 A1 | 1/2019 | Brabec et al. | |
| 2020/0285737 A1 | 9/2020 | Kraus et al. | |

(Continued)

FOREIGN PATENT DOCUMENTS

| | | |
|---|---|---|
| CN | 106846806 A | 6/2017 |
| CN | 108900476 A | 11/2018 |

(Continued)

OTHER PUBLICATIONS

Deng et al., Sparse Support Vector Machine for Network Behavior Anomaly Detection, 2020 IEEE 8th International Conference on Information, Communication and Networks (ICICN) Year: 2020 | Conference Paper | Publisher: IEEE.*

(Continued)

*Primary Examiner* — Roderick Tolentino
(74) *Attorney, Agent, or Firm* — Perkins Coie LLP

(57) ABSTRACT

A system and method for anomaly interpretation and mitigation. A method includes extracting at least one input feature vector from observation data related to an observation; applying an isolation forest to the at least one input feature vector, wherein the isolation forest includes a plurality of estimators, wherein each estimator is a decision tree, wherein the output of each estimator is a split-path of a plurality of split-paths, each split-path having a path-length and including name and a corresponding value for a respective output feature of a plurality of output features; generating a mapping object based on the application of the isolation forest to the at least one feature vector, wherein the mapping object includes the plurality of split-paths; clipping the mapping object based on the path-length of each split-path; and determining at least one mitigation action based on the clipped mapping object.

19 Claims, 4 Drawing Sheets

(56) References Cited

U.S. PATENT DOCUMENTS

| | | | |
|---|---|---|---|
| 2020/0334228 A1 | 10/2020 | Matyska et al. | |
| 2021/0067548 A1* | 3/2021 | Brandt | H04L 63/1466 |
| 2021/0097177 A1* | 4/2021 | Chistyakov | G06F 21/56 |
| 2021/0160266 A1* | 5/2021 | Sternby | H04L 63/1425 |
| 2021/0378577 A1* | 12/2021 | Sun | A61B 5/346 |
| 2022/0086179 A1* | 3/2022 | Levin | G06F 16/285 |
| 2022/0138321 A1* | 5/2022 | Shrestha | G06N 20/00 |
| | | | 713/187 |
| 2022/0327219 A1* | 10/2022 | Choi | G06F 21/577 |
| 2023/0011129 A1* | 1/2023 | Wuhib | G06F 11/0703 |

FOREIGN PATENT DOCUMENTS

| | | |
|---|---|---|
| EP | 3451219 A1 | 3/2019 |
| EP | 3896543 A1 | 4/2020 |
| JP | 2019179395 A | 10/2019 |
| WO | 2020124037 A1 | 6/2020 |

OTHER PUBLICATIONS

Zhang et al., "Network Anomaly Detection Based on Cooperative Semi-Supervised Support Vector Machine," 2019 International Conference on Networking and Network Applications (NaNA) Year: 2019 | Conference Paper | Publisher: IEEE.*

Chandola, et al., "Anomaly Detection: A Survey". ACM Computing Surveys, vol. 41, No. 3, Article 15, 2009, pp. 1-72.

Liu, et al., "Isolation Forest" 2008 Eight IEEE International Conference on Data Mining, 2009, pp. 413-422.

International Search Report and Written Opinion of International Searching Authority for PCT/IB2021/059726, ISA/IL, Jerusalem, Israel: dated Dec. 19, 2021.

Sheng, Xu, "Politecnico Di Milano Machine Learning Techniques for Fault Detection in Chemical Processes. The Tennessee Eastman Process case study," Dec. 31, 2019.

* cited by examiner

SYSTEM AND METHOD FOR ANOMALY DETECTION INTERPRETATION

TECHNICAL FIELD

The present disclosure relates generally to anomaly detection, and more specifically to providing additional contextual information for detected anomalies.

BACKGROUND

As the number of connected devices has increased significantly, network threats and intrusions have become more predominant than ever. Further, these threats and intrusions are constantly becoming more sophisticated, making attempts to detect and mitigate them much more challenging. Some existing intrusion detection methods use signature-based rules in order to detect malicious activities. These solutions utilize signatures of known anomalies and compare them to incoming data. Due to the large amount of variations among connected devices, the types of anomalies directed at such connected devices are also highly variable. As a result, the signature-based solutions have become cumbersome to effectively implement.

Some anomaly detection algorithms attempt to autonomously learn and capture the normal behavior of networks and attempt to distinguish deviations from a baseline representing such normal behavior. These solutions allow for detecting anomalies even when the anomalies are not predetermined irregularities.

Anomaly detection solutions are important in modern computing architectures since detection of anomalies often translates into critical actionable information. More specifically, when an anomaly is detected, mitigation actions can be performed. Further, additional information such as the type of anomaly can help to determine appropriate mitigation actions to perform. Thus, obtaining such information is desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for anomaly interpretation and mitigation. The method comprises: extracting at least one input feature vector from observation data related to an observation, wherein the observation indicates anomalous behavior of a connected device; applying an isolation forest to the at least one input feature vector, wherein the isolation forest includes a plurality of estimators, wherein each estimator is a decision tree, wherein the output of each estimator is a split-path of a plurality of split-paths, each split-path having a path-length and including name and a corresponding value for a respective output feature of a plurality of output features, wherein each output feature represents at least a portion of a description of why the observation was determined to indicate anomalous behavior; generating a mapping object based on the application of the isolation forest to the at least one feature vector, wherein the mapping object includes the plurality of split-paths; clipping the mapping object based on the path-length of each split-path; and determining at least one mitigation action based on the clipped mapping object.

Certain embodiments disclosed herein also include a non-transitory computer readable medium having stored thereon causing a processing circuitry to execute a process, the process comprising: extracting at least one input feature vector from observation data related to an observation, wherein the observation indicates anomalous behavior of a connected device; applying an isolation forest to the at least one input feature vector, wherein the isolation forest includes a plurality of estimators, wherein each estimator is a decision tree, wherein the output of each estimator is a split-path of a plurality of split-paths, each split-path having a path-length and including name and a corresponding value for a respective output feature of a plurality of output features, wherein each output feature represents at least a portion of a description of why the observation was determined to indicate anomalous behavior; generating a mapping object based on the application of the isolation forest to the at least one feature vector, wherein the mapping object includes the plurality of split-paths; clipping the mapping object based on the path-length of each split-path; and determining at least one mitigation action based on the clipped mapping object.

Certain embodiments disclosed herein also include a system for anomaly interpretation and mitigation. The system comprises: a processing circuitry; and a memory, the memory containing instructions that, when executed by the processing circuitry, configure the system to: extract at least one input feature vector from observation data related to an observation, wherein the observation indicates anomalous behavior of a connected device; apply an isolation forest to the at least one input feature vector, wherein the isolation forest includes a plurality of estimators, wherein each estimator is a decision tree, wherein the output of each estimator is a split-path of a plurality of split-paths, each split-path having a path-length and including name and a corresponding value for a respective output feature of a plurality of output features, wherein each output feature represents at least a portion of a description of why the observation was determined to indicate anomalous behavior; generate a mapping object based on the application of the isolation forest to the at least one feature vector, wherein the mapping object includes the plurality of split-paths; clip the mapping object based on the path-length of each split-path; and determine at least one mitigation action based on the clipped mapping object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
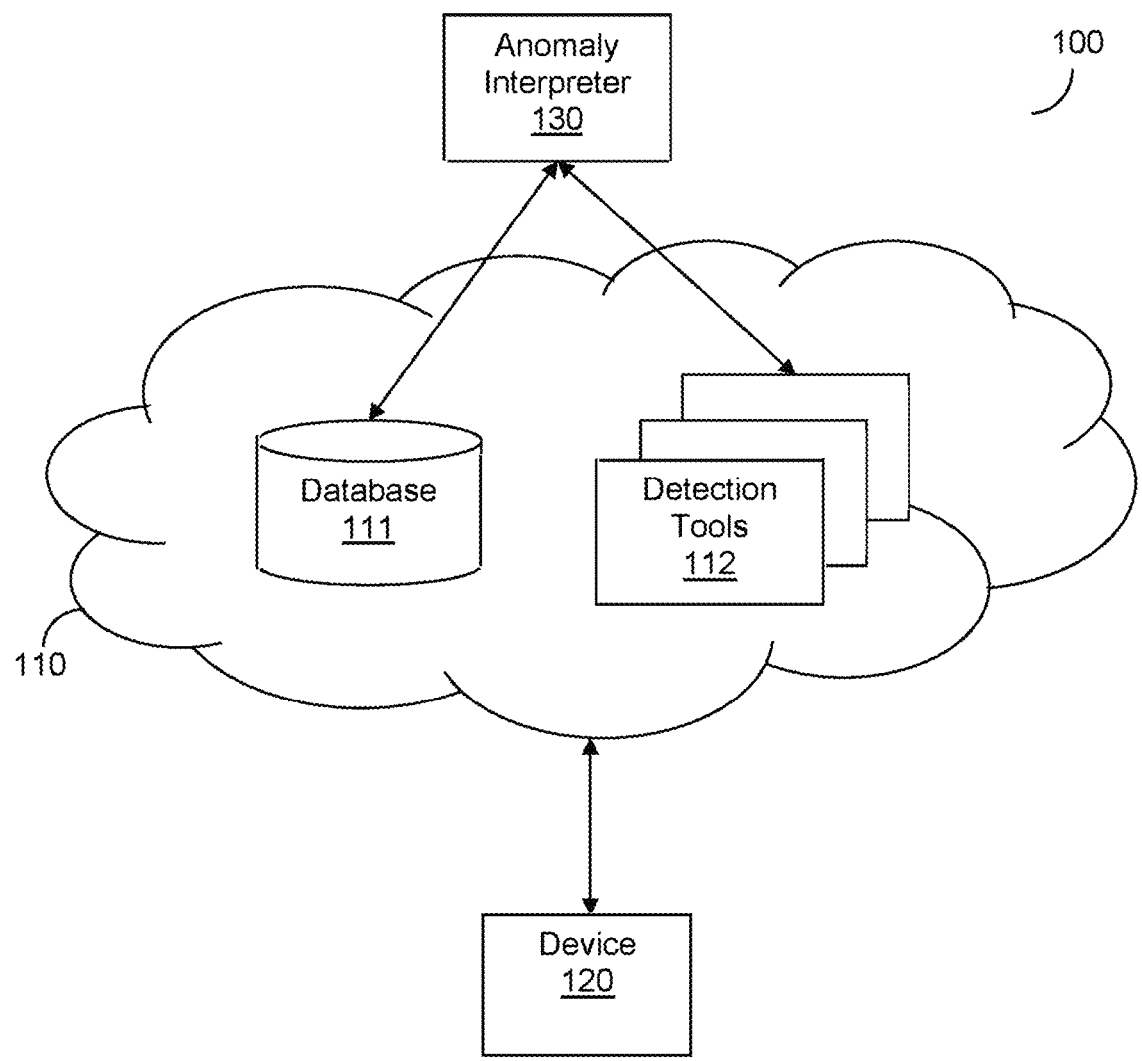
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the need for information related to anomalies noted above, it has been identified that contextual information related to why and how particular behaviors were determined as anomalous would improve mitigation of anomalies. To this end, the disclosed embodiments include techniques for providing such contextual information.

It is also noted that manual evaluation of anomalies relies on a "by eye" approach to evaluating data in which the manual observer looks at a plot of data in order to identify anomalies based on data that "looks" off to the observer and then drawing additional conclusions regarding each identified anomaly based on the how the data surrounding the anomaly appears. This process is highly subjective and open to human error. Additionally, this process is high maintenance and cannot be scaled effectively. The disclosed embodiments utilize an isolation forest and rules for manipulating results of applying the isolation forest which provide an objective and more accurate interpretation of anomalies than manual solutions.

The various disclosed embodiments include a method and system for anomaly interpretation and mitigation. The disclosed embodiments utilize an ensemble anomaly detection method in order to provide additional data beyond the detection of the anomaly itself. Such additional data allows for interpreting the anomaly. This, in turn, allows for more accurately determining actions for mitigating the anomaly.

In an embodiment, an observation related to anomalous behavior of a device is input to multiple estimator isolation trees (also referred to as "estimators") of an isolation forest. The observation may be, but is not limited to, an output of an anomaly detection tool that has been flagged as anomalous or potentially anomalous. Each estimator is a decision tree representing a hypothesis for why an anomaly was detected. All estimators are iterated for each observation, and each estimator outputs a split-path including a set of features which explain why the observation was determined to be anomalous. Split-paths and path-lengths for each observation are extracted for each estimator. The extracted split-paths and path-lengths are utilized to generate a mapping object. The mapping object maps each observation to the respective split-path output by each estimator for the observation. The mapping object can be manipulated in order to provide more accurate contextual data.

In a further embodiment, observations are given anomaly scores, and only observations having anomaly scores above a threshold are analyzed for interpretation. Thus, the estimators are only iterated for these observations having anomaly scores above a threshold. Only analyzing observations having anomaly scores above a threshold allows for filtering out observations which are unlikely to be anomalies.

In this regard, it has been identified that anomalous observations for connected devices are far less common than normal observations such that, when represented in feature space, the anomalous observations reside far from the normal observations. Therefore, by randomly partitioning the data and inputting the observations into an isolation forest as described herein, the result is that anomalous observations are isolated closer to the root of each decision tree with a shorter path-length on average as compared to normal observations. The disclosed embodiments utilize an isolation forest to provide additional contextual information about anomalies, which in turn increases the accuracy of determining appropriate mitigation actions for each anomaly.

Further, the disclosed embodiments provide techniques for further improving the results of isolation forest in order to more accurately provide the contextual information. To this end, the disclosed embodiments provide techniques for creating and manipulating a mapping object based on the outputs of the decision trees of the isolation forest. Such manipulation includes clipping the longest split-paths from the mapping object such that only the estimators with the shortest split-paths are retained and utilized to generate contextual data. The disclosed embodiments further provide techniques for providing additional mapping based on the features of the remaining decision trees represented after clipping the mapping object. As a result, the manipulation of the mapping object provides significantly improved anomaly interpretation and, consequently, mitigation.

FIG. 1 shows an example network diagram 100 utilized to describe the various disclosed embodiments. In the example network diagram 100, a device 120 and an anomaly interpreter 130 are deployed such that each can access a network 110. The network 110 may be, but is not limited to, a wireless, cellular or wired network, a local area network (LAN), a wide area network (WAN), a metro area network (MAN), similar networks, and any combinations thereof.

A device 120 accesses (shown) or is deployed in physical proximity (not shown) to the network 110. The device 120 may be, but is not limited to, a personal computer, a laptop, a tablet computer, a smartphone, a wearable computing device, a printer, or any other device connected to the network 110 or deployed in physical proximity to network infrastructure (e.g., a router, not shown) of the network 110.

In an example implementation, the network 110 includes a database 111 and one or more anomaly detection tools 112. The anomaly interpreter 130 is configured to access the database 111, the anomaly detection tools 112, or both, to obtain data related to anomalies that can be utilized for anomaly interpretation in accordance with the disclosed embodiments. The database 111 may store data output by the anomaly detection tools 112 related to detected anomalies.

The anomaly detection tools 112 are configured to collect data related to the device, network activity by the device 120, or both. Such data may include data related to observations such as, but not limited to, data included in traffic to or from the device 120, amounts of traffic sent by the device 120, number of endpoints receiving traffic from the device 120, type of traffic sent by the device 120 (e.g., encrypted or unencrypted, repetitive or non-repeating, etc.), common vulnerabilities and exposure exhibited by the device 120 (e.g., for the device 120, for software running on the device 120, or both), domains and Internet Protocol (IP) addresses accessed by the device 120, types and versions of software installed on the device 120, type and version of an operating system installed on the device 120, amount and type of external communication options (e.g., ports, protocols, amount of service set identifiers broadcasted, amount of different antennae, etc.), geographical location of the device, geographical movements of the device, and the like. The network activity data may be collected with respect to the device 120, an operating system running on the device 120, for each application running on the device 120, or a combination thereof.

The anomaly interpreter 130 is configured to provide additional contextual data related to anomalous observations as described herein. More specifically, the anomaly interpreter 130 is configured to utilize the data accessed from the database 111 and/or the anomaly detection tools 112 in order to generate input feature vectors and to provide those input feature vectors to decision trees of an isolation forest in order to provide contextual data related to why the observation is anomalous. The contextual data may be utilized in addition to the accessed data in order to determine mitigation actions for mitigating the observed anomalies.

It should be noted that the disclosed embodiments are not limited to the particular layout shown in FIG. 1. For example, the anomaly interpreter 130 is illustrated in FIG. 1 as being deployed outside the network 110, but the anomaly interpreter 130 may be equally deployed in the network 110 without departing from the scope of the disclosure. Additionally, the anomaly interpreter 130 and the detection tools 112 are shown separately for simplicity purposes, but that the anomaly interpreter 130 may incorporate or be incorporated in one of the detection tools 112 without departing from the scope of the disclosure.

Figure 2:
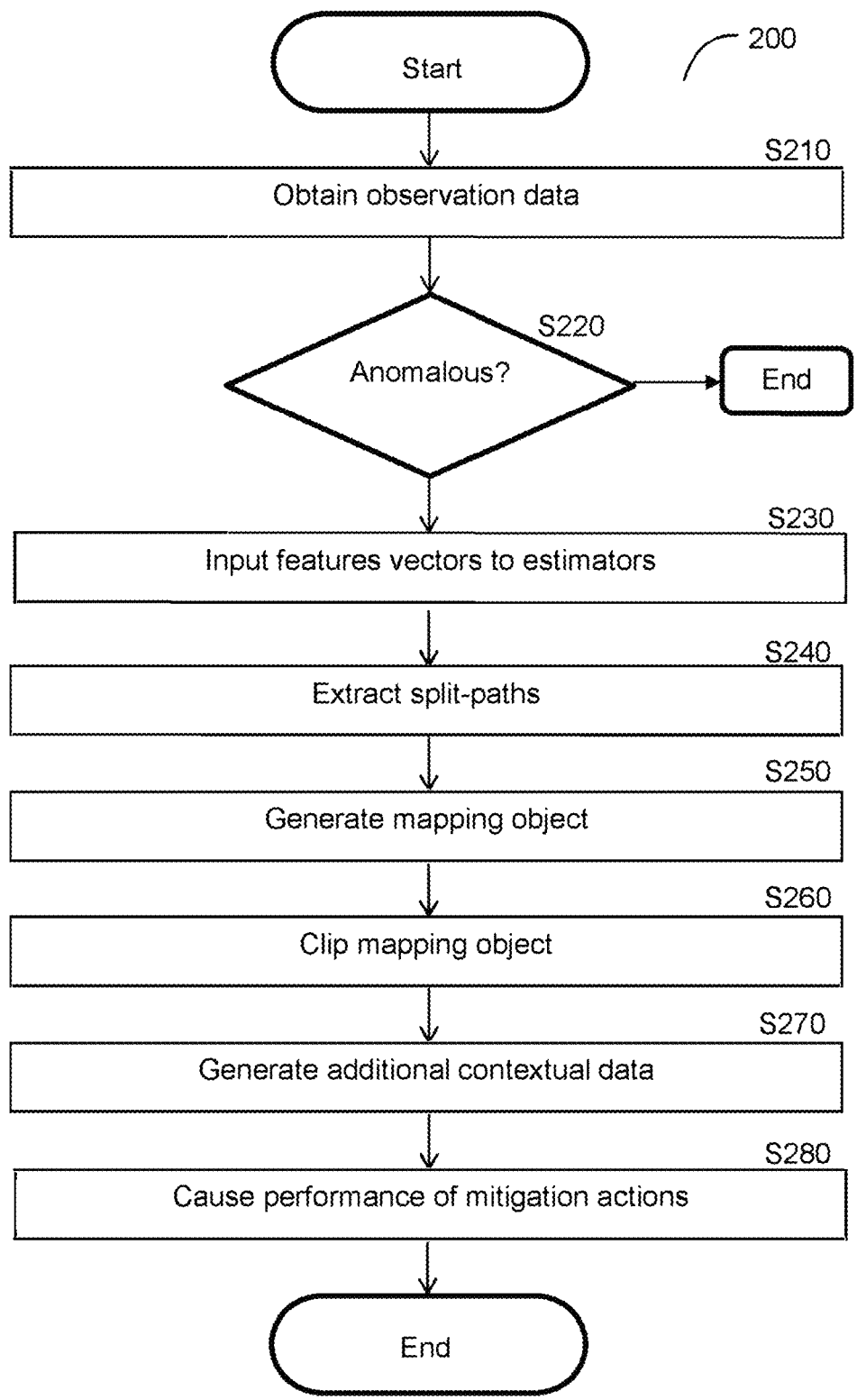
FIG. 2 is a flowchart illustrating a method for anomaly interpretation according to an embodiment.

FIG. 2 is an example flowchart 200 illustrating a method for anomaly interpretation according to an embodiment. In an embodiment, the method is performed by the anomaly interpreted 130, FIG. 1.

At S210, observation data is obtained. The observation data may be received from an anomaly detection tool (e.g., one of the detection tools 112, FIG. 1), retrieved from a database (e.g., the database 111, FIG. 1), both, and the like. The observation data includes data for an observation related to connected device behavior.

At optional S220, it is determined whether the observation is an anomalous observation and, if so, execution continues with S230; otherwise, execution terminates. In an embodiment, the observation may have a corresponding anomaly score, and the observation is determined to be anomalous if the observation has an anomaly score above a threshold. Such a score may be provided by, for example, an anomaly detection tool, or may be generated based on the data of the observation. In an example implementation, the anomaly score may be determined as described in the paper "Isolation Forest" by Liu et al., the contents of which are hereby incorporated by reference. Liu, Fei Tony; Ting, Kai Ming; Zhou, Zhi-Hua (December 2008). "Isolation Forest". 2008 Eighth IEEE International Conference on Data Mining: 413-422. doi:10.1109/ICDM.2008.17. ISBN 978-0-7695-3502-9.

In this regard, it is noted that some observations may be unusual enough to warrant detection but may not rise to the level of anomalous. To this end, only inputting certain observations (i.e., observations which are predetermined as more likely to represent anomalies) to the isolation tree conserves computing resources related to anomaly interpretation. This is particularly important due to the extremely high number of observations which may need to be processed. Processing such a high number of observations may utilize excessive computing resources, slow processing, or both.

At S230, one or more input features vectors are input to multiple estimators of an isolation forest. Each estimator is a binary decision tree of the isolation forest and. In this regard, it is noted that binary decision trees may offer certain advantages which may be beneficial in at least some implementations of the disclosed embodiments. More specifically, the splitting value chosen at each iteration dictates a binary decision at each stage. Additionally, the total number of nodes in each binary tree grows linearly with sample size such that the memory requirement has an upper boundary (i.e., memory use will not increase exponentially). Further, using binary decisions at each node ensures that path length can be more easily calculated as compared to decision trees which may have varying numbers of outcomes for each decision.

Each estimator includes multiple nodes beginning with a root node, ending with multiple leaf nodes, and including one or more intermediate nodes. The output of each estimator is a split-path including one or more output features corresponding to the leaf nodes encountered during traversal that partially explains why an observation was determined to be anomalous such that the features of all of the estimators collectively provide an explanation of why an observation was determined to be anomalous. Each node of an estimator represents a feature and corresponding splitting value for that feature. The nodes may be established each time an estimator is initiated by randomly selecting features and splitting values.

The feature of each node may be, but is not limited to, a feature of an observation related to the circumstances that resulted in the observation such as, but not limited to, metrics of data included in traffic to or from a device, amounts of traffic sent by a device, number of endpoints receiving traffic from a device, type of traffic sent by a device (e.g., encrypted or unencrypted, repetitive or non-repeating, etc.), type of common vulnerabilities and exposure exhibited by a device (e.g., for the device, for software running on the device, or both), domains accessed by a device, Internet Protocol address accessed by a device, type of software installed on a device, version of software installed on a device, type of an operating system installed on a device, version of an operating system installed on a device, amount of external communication options of a given type (e.g., ports, protocols, amount of service set identifiers broadcasted, amount of different antennae, etc.), geographical location of a device, geographical movements of a device, and the like.

The splitting value of each node is a value that can be utilized to define two categories such that a decision of each node is determined based on a category that a given observation falls into. As a non-limiting example, the splitting value for a feature operating system version of a device may be a specific version number such that lower version numbers fall into one category and greater or equal version numbers fall into another category. As another non-limiting example, the splitting value for a feature operating system type may be a specific type of operating system such that operating systems of that type fall into one category and operating systems that are not of that type fall into another category.

As a non-limiting example for a portion of a decision tree, possible features for nodes may include inbound bytes count and outbound bytes count, with each feature having possible values between 0 and 100 such that a splitting value between 0 and 100 is selected. When a new iteration of the estimator is required, one of the features is randomly selected as inbound bytes count, and a splitting value of 76 is randomly selected. In this example, the splitting value 76 is used to define categories which are ranges of values. For example, inbound bytes count values of observations that are less than 76 may be a first category resulting in traversing a first child node while inbound bytes count values of observations that are greater than or equal to 76 may be a second category resulting in traversing a second child node.

The root node of an estimator is the first node of the tree, and all traversal begins from that root node. Each intermediate node is a node other than the root node that has child nodes such that traversing the decision tree includes traversing to one of the child nodes of a current node (i.e., either the root node or the most recent intermediate node that was traversed to) based on a result of a decision at the current node. Each leaf node is a node which has no child nodes and therefore will be the last node encountered when traversing the decision tree.

Each input features vector is extracted from the observation data. In some implementations, one input features vector may be extracted from the observation data, and each estimator is applied to that input features vector. In other implementations, different input features vectors may be extracted and input for different estimators.

At S240, split-paths are extracted for each estimator based on the traversal of the nodes of the estimator as applied to the extracted input features vectors. The split-path for each estimator is the split-path from the root node to a leaf node encountered while traversing nodes of the estimator when applied to the respective input feature vector. In other words, a split-path is the path taken when traversing a decision tree. Each split-path has a corresponding path-length determined based on a number of nodes traversed while traversing the decision tree.

At S250, a mapping object is generated based on the extracted split-paths. The mapping object is a data object which maps the observation to the respective split-path output by each estimator for the observation. The mapping object stores the output feature for each estimator determined by traversing the estimator. Each output feature may have an identifier (e.g., a name) and a value.

At S260, the mapping object is clipped based on the path-lengths of the split-paths and a predetermined ratio of the total number of estimators. In an embodiment, S260 includes sorting the split-paths based on path-length and removing a number of split-paths from the mapping object based on the predetermined ratio of the total number of estimators. As a non-limiting example, when the predetermined ratio is 0.1 and there are 100 estimators, all split-paths except for the 10 (0.1×100) split-paths having the shortest path-length are removed from the mapping object. In other words, the 10 split-paths having the shortest path-lengths are selected as the split-paths of interest such that their respective estimators are determined to more accurately explain why the observation is anomalous than the combination of all estimators.

By removing the split-paths, the output features for the removed split-paths are also removed from the mapping object such that the mapping object does not indicate those removed output features as describing the reasons why the observation was determined to be anomalous.

In this regard, it has been identified that estimators with shorter path-lengths output features which, on average, provide a better representation of why an observation was determined to be anomalous. Accordingly, removing the split-paths having the longest path-lengths improves the accuracy of such features in describing the full context of why the observation was determined to be anomalous.

At S270, additional contextual data may be generated for each output feature. In an embodiment, the additional contextual data for each output feature includes statistical data determined based on the remaining split-paths of the clipped mapping object such as, but not limited to, a number of occurrences of the output feature among the population of all remaining output features which remain in the mapping object after the clipping at S260, a percentile of the value of the output feature among the values of the remaining output features, data related to the position of the output feature within a distribution of the remaining output features, a combination thereof, and the like.

As noted above, clipping split-paths having the longest path-lengths provides a more accurate description of why the observation was determined to be anomalous. Generating the additional contextual data based on the output features which remain after clipping the mapping object further improves the accuracy of the additional contextual data and, consequently, allows for more accurate interpretation of the anomaly that was observed.

In an embodiment, S270 may include adding the additional contextual data to the mapping object. Alternatively or collectively, the additional contextual data may be utilized to generate a summary for each feature including the identifier and value of each feature as well as the additional contextual data for the feature. The mapping object, the summary, or both, may be sent (e.g., to a device of an administrator) via, for example, a notification.

At S280, one or more mitigation actions are caused to be performed based on the mapping object. The mitigation actions may be performed directly, or commands for performing the mitigation actions may be sent to one or more devices or systems. In an embodiment, the mitigation actions are determined based on mitigation rules and the output features remaining in the mapping object. Such mitigation rules may define mitigation actions to be performed for certain combinations of output features or otherwise for output features which meet one or more conditions.

It should be noted that FIG. 2 is described as providing contextual data and mitigation actions for a single observation merely for simplicity purposes, and that the disclosed embodiments are equally applicable to multiple observations. To this end, the method of FIG. 2 may be applied for multiple observations sequentially, in parallel, as needed (e.g., as each observation is received), and the like.

Figure 3:
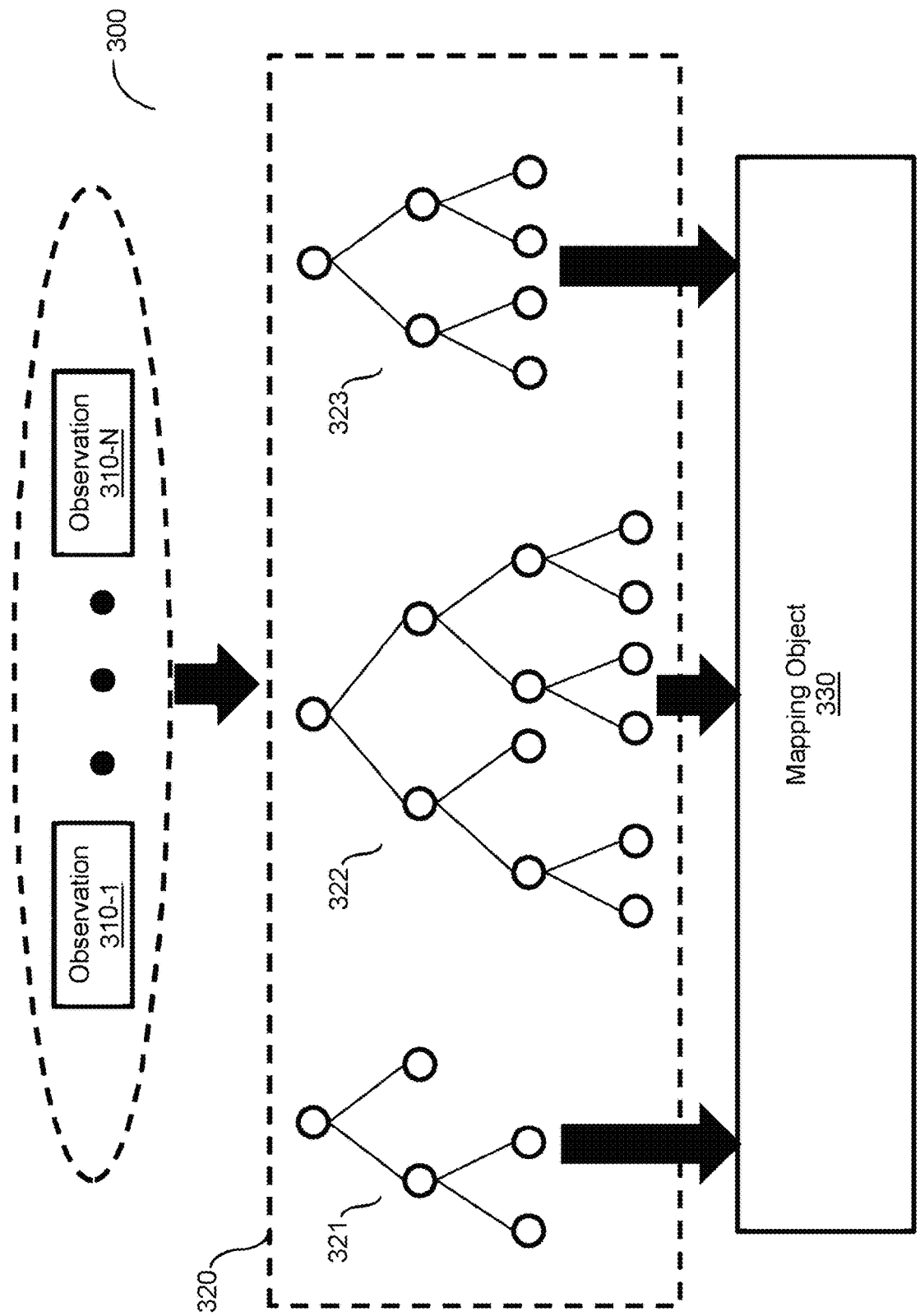
FIG. 3 is a flow diagram illustrating flow of data into and out of an example isolation forest.

FIG. 3 is an example flow diagram 300 illustrating flow of data into and out of an example isolation forest. The example flow diagram 300 illustrates observations 310-1 through 310-N (hereinafter referred to individually as an observation 310 or collectively as observations 310), which are input to an isolation forest 320. The isolation forest includes multiple estimators 321 through 323. Each estimator 321 through 323 is a decision tree representing a hypothesis regarding the circumstances which caused an observation to be determined as anomalous such that the outputs of the estimators 321 through 323 collectively represent a potential explanation of why the observation was anomalous.

Each estimator 321 through 323 is traversed beginning from a root node by navigating through leaf nodes of the tree. At each node, a decision is made and a branch of the tree is selected based on the decision. Traversing the selected branch results in navigating to one of the child nodes of the most recent node. The last node encountered during the navigation of one of the estimators 321 through 323 is a leaf node for which there are no further child nodes.

From the outputs of the estimators 321 through 323, a split-path from a root node in the respective estimator 321 through 323 to the last node encountered while applying the estimator 321 through 323 as well as a path-length indicating the length of its respective split-path are extracted. The extracted split-paths and path-lengths are used as inputs to create a mapping object 330. The mapping object 330 may therefore be utilized to compare the path-lengths among the estimators 321 through 323, thereby allowing for identifying the shortest path-length to the anomalous observation, which can be utilized to determine additional contextual information regarding the anomaly as described above.

It should be noted that the example isolation forest shown in FIG. 3 is depicted as including three estimators 321 through 323 for example purposes, but that other numbers of decision trees may be equally utilized without departing from the disclosed embodiments. Additionally, the example estimators 321 through 323 are depicted as binary decision trees having particular nodes and arrangements of nodes merely for example purposes, but that other numbers of nodes and tree arrangements may be equally utilized in accordance with the disclosed embodiments.

Figure 4:
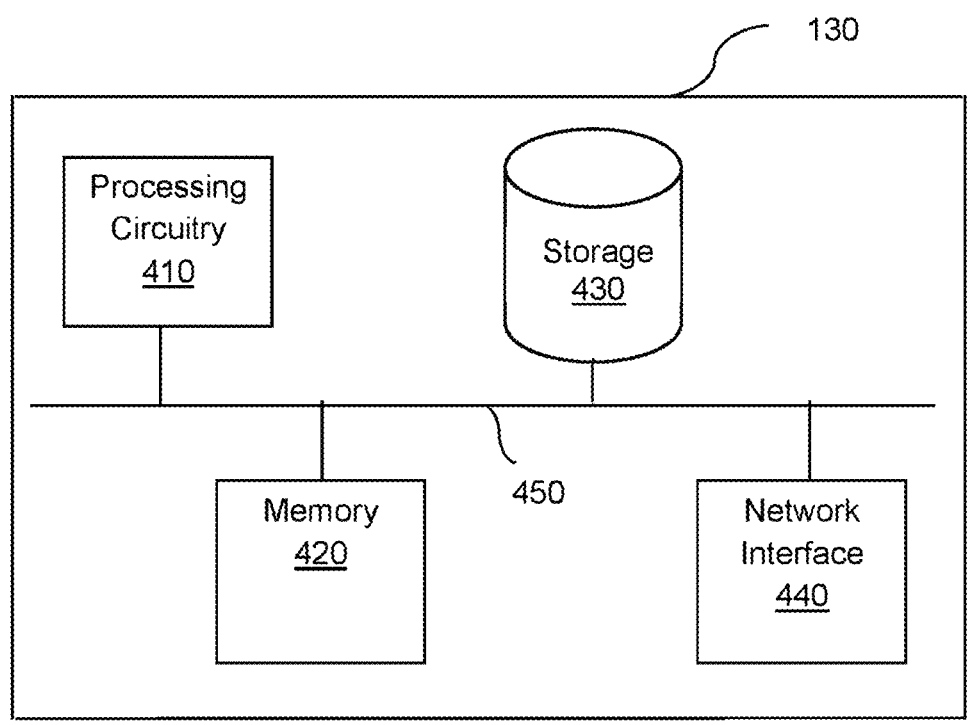
FIG. 4 is a schematic diagram of an anomaly interpreter according to an embodiment.

FIG. 4 is an example schematic diagram of an anomaly interpreter 130 according to an embodiment. The anomaly interpreter 130 includes a processing circuitry 410 coupled to a memory 420, a storage 430, and a network interface 440. In an embodiment, the components of the anomaly interpreter 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the anomaly interpreter 130 to communicate with, for example, the database 111, the anomaly detection tools 112, and the like.

It should be understood that the embodiments described herein are not limited to the specific architecture illustrated in FIG. 4, and other architectures may be equally used without departing from the scope of the disclosed embodiments. As noted above, in some implementations, the anomaly interpreter 130 may incorporate one or more anomaly detection tools and utilize the outputs of those incorporated anomaly detection tools as described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for anomaly interpretation and mitigation, comprising:
   extracting an input feature vector from observation data indicating anomalous behavior of a connected device;
   applying an isolation forest to the input feature vector, wherein the isolation forest includes a plurality of estimators, wherein each estimator is a decision tree, wherein an output of each estimator is a split-path of a plurality of split-paths, each split-path having a path-length and including name and a corresponding value for a respective output feature of a plurality of output features, wherein each output feature represents at least a portion of a description of why the observation was determined to indicate anomalous behavior;
   generating a mapping object based on an application of the isolation forest to the feature vector, wherein the mapping object includes the plurality of split-paths;
   removing a number of split-paths from the mapping object based at least in part on a predetermined ratio of a total number of the plurality of estimators;
   determining additional context data determined from remaining split-paths; and
   determining at least one mitigation action.

2. The method of claim 1, further comprising:
   sorting the plurality of split-paths based on their respective path-lengths; and removing at least one split-path from the plurality of split-paths.

3. The method of claim 2, further comprising:
   determining the at least one split-path to be removed from the plurality of split-paths based on the sorted plurality of split-paths and a ratio of a total number of estimators.

4. The method of claim 1, further comprising:
   generating additional contextual data, wherein the at least one mitigation action is determined based further on the additional contextual data.

5. The method of claim 4, wherein the additional contextual data includes statistical data for each output feature determined based on the remaining split-paths.

6. The method of claim 5, wherein the statistical data indicates, for each output feature, at least one of: a number of occurrences of the output feature among the output features of the remaining split-paths, a percentile of the value of the output feature with respect to other observations in a sub-population of observations, and a position of the output feature within a distribution of the output features of the remaining split-paths.

7. The method of claim 1, wherein the observation was determined to indicate an anomaly.

8. The method of claim 7, wherein the observation has an anomaly score representing a likelihood that the observation indicates an anomaly, wherein the anomaly score is above a threshold.

9. The method of claim 1, wherein each estimator is a binary decision tree.

10. A non-transitory computer readable medium having stored thereon instructions for causing a processing circuitry to execute a process, the process comprising:
    extracting at least one input feature vector from observation data related to an observation, wherein the observation indicates anomalous behavior of a connected device;
    applying an isolation forest to the at least one input feature vector, wherein the isolation forest includes a plurality of estimators, wherein each estimator is a decision tree, wherein an output of each estimator is a split-path of a plurality of split-paths, each split-path having a path-length and including name and a corresponding value for a respective output feature of a plurality of output features, wherein each output feature represents at least a portion of a description of why the observation was determined to indicate anomalous behavior;
    generating a mapping object based on an application of the isolation forest to the at least one feature vector, wherein the mapping object includes the plurality of split-paths;
    removing a number of split-paths from the mapping objects based at least in part on a predetermined ratio of a total number of the plurality of estimators;
    determining additional context data determined from remaining split-paths; and
    determining at least one mitigation action.

11. A system for anomaly interpretation, comprising: a processing circuitry; and
    a memory, the memory containing instructions that, when executed by the processing circuitry, configure the system to:
    extract at least one input feature vector from observation data related to an observation, wherein the observation indicates anomalous behavior of a connected device;
    apply an isolation forest to the at least one input feature vector, wherein the isolation forest includes a plurality of estimators, wherein each estimator is a decision tree, wherein an output of each estimator is a split-path of a plurality of split-paths, each split-path having a path-length and including name and a corresponding value for a respective output feature of a plurality of output features, wherein each output feature represents at least a portion of a description of why the observation was determined to indicate anomalous behavior;
    generate a mapping object based on an application of the isolation forest to the at least one feature vector, wherein the mapping object includes the plurality of split-paths;
    remove a number of split-paths from the mapping object based at least in part on a predetermined ratio of a total number of the plurality of estimators;
    determining additional context data determined from remaining split-paths; and
    determine at least one mitigation action.

12. The system of claim 11, wherein the system is further configured to:
    sort the plurality of split-paths based on their respective path-lengths; and remove at least one split-path from the plurality of split-paths.

13. The system of claim 12, wherein the system is further configured to:
    determine the at least one split-path to be removed from the plurality of split-paths based on the sorted plurality of split-paths and a ratio of a total number of estimators.

14. The system of claim 11, wherein the system is further configured to:
    generate additional contextual data, wherein the at least one mitigation action is determined based further on the additional contextual data.

15. The system of claim 14, wherein the additional contextual data includes statistical data for each output feature determined based on the remaining split-paths.

16. The system of claim 15, wherein the statistical data indicates, for each output feature, at least one of: a number of occurrences of the output feature among the output features of the remaining split-paths, a percentile of the value of the output feature with respect to other observations in a sub-population of observations, and a position of the output feature within a distribution of the output features of the remaining split-paths.

17. The system of claim 11, wherein the observation was determined to indicate an anomaly.

18. The system of claim 17, wherein the observation has an anomaly score representing a likelihood that the observation indicates an anomaly, wherein the anomaly score is above a threshold.

19. The system of claim 11, wherein each estimator is a binary decision tree.

\* \* \* \* \*